United States Patent [19]

Mook

[11] 3,743,094

[45] July 3, 1973

[54] ROTATING SCREEN SEPARATOR

[75] Inventor: Philip H. Mook, Huntington Beach, Calif.

[73] Assignee: Sweco, Inc., Los Angeles, Calif.

[22] Filed: Dec. 20, 1971

[21] Appl. No.: 210,179

Related U.S. Application Data

[63] Continuation of Ser. No. 42,099, June 1, 1970, abandoned.

[52] U.S. Cl.................... 210/78, 210/197, 210/380
[51] Int. Cl............................................. B01d 21/26
[58] Field of Search..................... 210/78, 197, 372, 210/380

[56] References Cited
UNITED STATES PATENTS

| 946,476 | 1/1910 | Warner.......................... 210/380 X |
| 3,511,373 | 5/1970 | McKibben et al................. 209/234 |

*Primary Examiner*—Samih N. Zaharna
*Assistant Examiner*—F. F. Calvetti
*Attorney*—Lyon & Lyon

[57] ABSTRACT

There are disclosed herein equipment and methods for screening and concentrating waste water overflow from combined sewer systems. Exemplary equipment includes a separator employing a substantially cylindrical rotating screen. Influent is piped upwardly into the equipment and deflected outwardly toward the inner surface of the screen in a manner to achieve a desired flow rate and flow pattern of the influent onto the screen. Means are provided for controlling the flow rate and for suitably directing the influent in a plurality of substantially discrete inclined streams toward the inner surface of the rotating screen. The screen is rotated at a speed to achieve a desired centrifugal force. Effluent passes through the screen to an outlet and the remaining concentrate passes to an outlet. A certain amount of the influent splashes from the inner surface of the screen, and is received by a backsplash pan and may be recirculated and rescreened. The screen is in the form of a screen cage having a plurality of removable screen panels for facilitating replacement of damaged screens or changing of screen type or mesh size. Cleaning means is provided for directing a cleaning fluid periodically at the screen. The methods disclosed involve the manner in which the influent, effluent, concentrate and backsplash are handled, and the manner in which the influent is screened to achieve a fluid concentrate which is pumpable to other treatment equipment for ultimate disposal. Additionally, a sequence of influent feed and screen cleaning is described.

8 Claims, 13 Drawing Figures

United States Patent [19]
Mook
[11] 3,743,094
[45] July 3, 1973
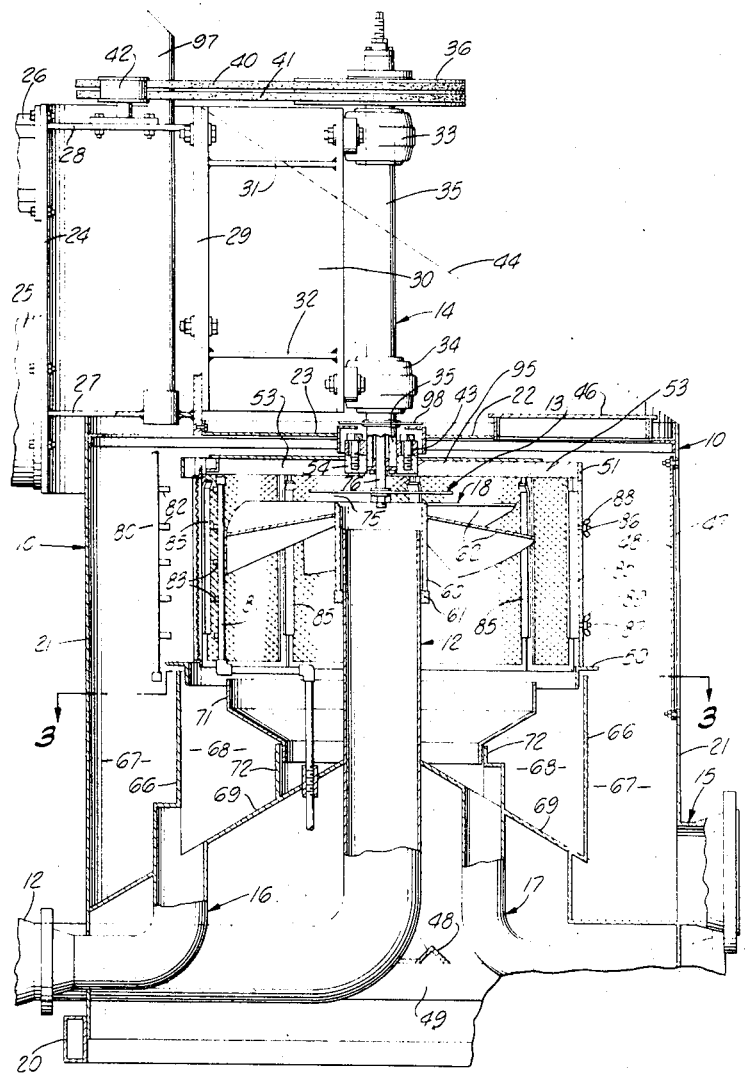

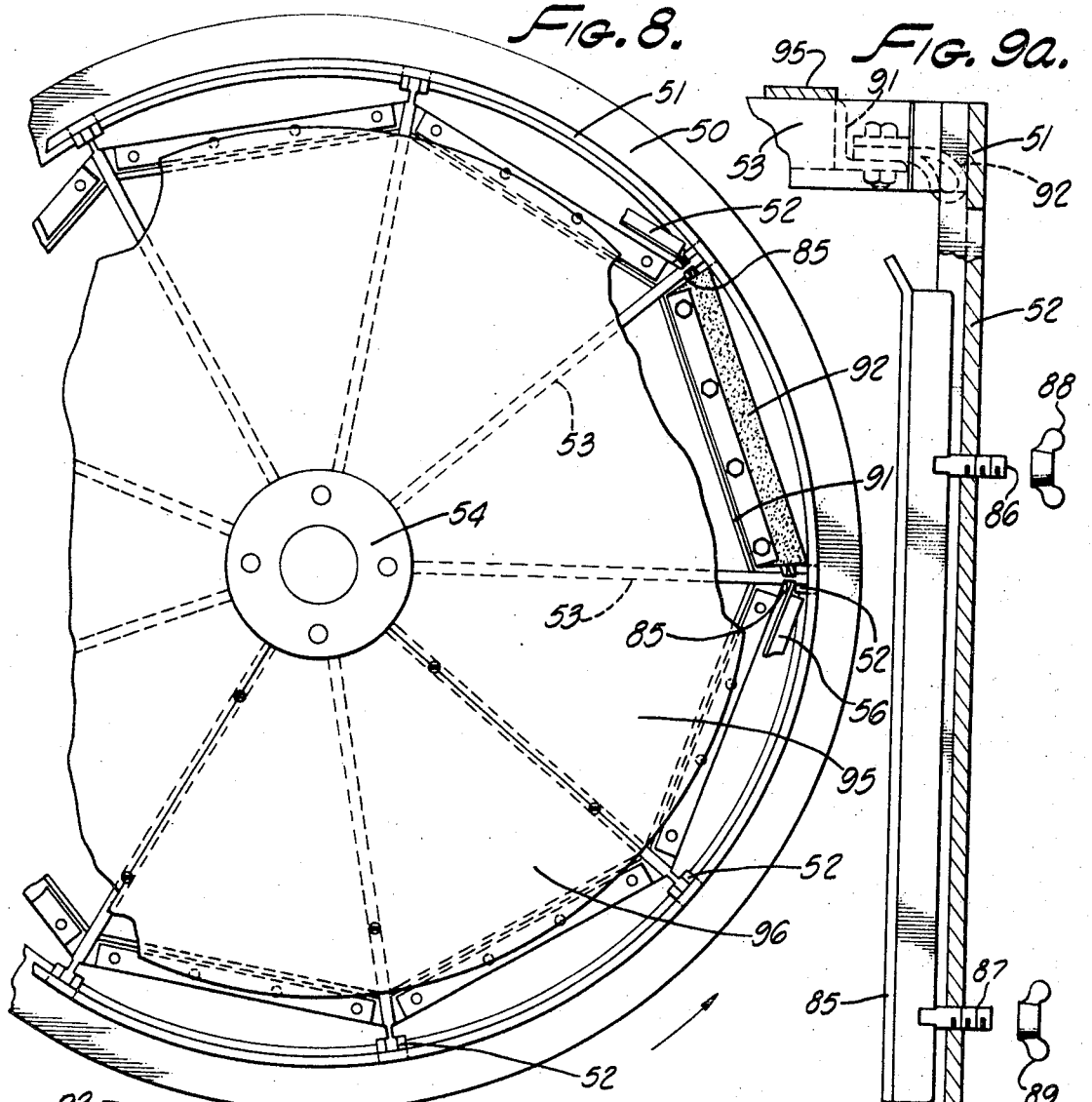
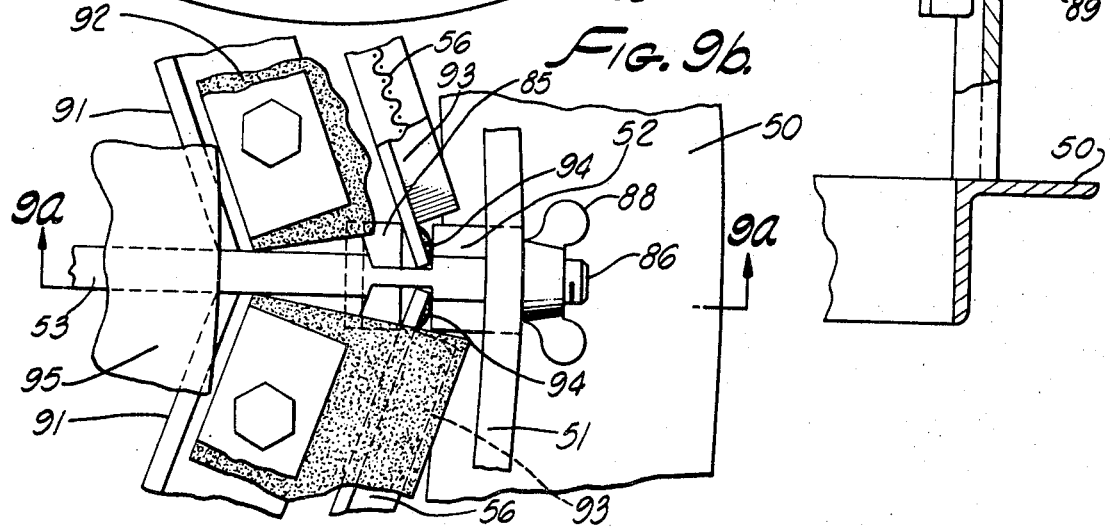

ROTATING SCREEN SEPARATOR

CROSS REFERENCE TO RELATED APPLICATIONS

This a continuation of application Ser. No. 42,099, filed June 1, 1970, now abandoned.

The concepts disclosed herein are related to those disclosed in copending application Ser. No. 640,241, filed May 22, 1967, now U.S. Pat. No. 3,539,008, entitled "Screening Apparatus Employing Rotating Cylindrical Screen and Stationary Feed Means," and U.S. Pat. No. 3,511,373, both of which are assigned to the assignee of the present application and the disclosures of which are incorporated herein by reference. Briefly, said application Ser. No. 640,241 discloses apparatus involving a rotating substantially cylindrical screen in combination with a stationary distribution means for screening an influent. The screen and distribution means may be used in combination with a downstream planar vibratory separator for further screening of the concentrate from the rotating screen. Said Pat. No. 3,511,373 discloses apparatus similar to that in said application and is directed to means for facilitating cleaning of said rotating screen.

Reference is also made to related applications, filed concurrently herewith, Ser. No. 42,098, (Lyon & Lyon Docket 132/171), entitled "Up-Flow Separator", filed in the name of Theodore R. Westfall; Ser. No. 42,165, (Lyon & Lyon Docket 132/172), entitled "Improved Wastewater Concentration", filed in the name of Walter J. Talley, Jr.; and Ser. No. 42,100, (Lyon & Lyon Docket 132/184), entitled "Wastewater Concentration", filed in the name of Walter J. Talley, Jr. and Howard W. Wright, Jr. These applications contain a similar disclosure to that set forth herein, but include claims directed to various of the structural and operational features disclosed herein.

BACKGROUND OF THE INVENTION

This invention relates to the screening of a liquid-solids influent to achieve a desired separation of liquids and solids, and more particularly to screening of storm water, sewage or storm water overflow from combined sewer systems.

Although the present inventive concepts are useful in screening various materials, they have particular application for water polution control and, thus, will be described in this environment and particularly for fine-mesh screening for primary treatment of storm water overflow from combined sewer systems. As set forth in a research report on treatment of storm water overflow entitled "Rotary Vibratory Fine Screening of Combined Sewer Overflows" prepared by Cornell, Howland, Hayes and Merryfield in connection with Dept. of the Interior Contract 14-12-128 and dated March 1970, the majority of the existing combined sewers throughout the nation do not have adequate capacity during heavy storm periods to transport all waste and storm-caused combined flows to a treatment facility. The overflow is bypassed to a receiving stream, thus causing pollution in the nation's water courses.

As further described in said report, the Federal Water Pollution Control Administration published a report in 1967 reviewing the effects and means of correcting combined sewer overflows on a national basis. Of the two hundred million people residing in the United States, approximately one hundred and twenty-five million are served by combined or separate sewer systems, and of the one hundred and twenty-five million approximately 29 percent are served by combined sewers. Combined sewers are designed to receive all types of waste flows, including storm water, for ultimate treatment at a treatment facility. In determining the size of the combined sewer, it has been common engineering practice to provide capacity for three to five times the dry-weather flow. During intensive storm periods, however, the storm-caused combined flow may be two to one hundred times the dry-weather flow, making overflow conditions unavoidable. To compound the problem, most treatment facilities are not designed to handle the hydraulic load of the combined sewer and, therefore, are required to bypass a portion of the storm-caused combined flow to protect the treatment facility and treatment process from damage. The nation's treatment facility bypass flows an average estimated 350 hours during the year, or about 4 percent of the total operation time. The pollutional impact of the storm-caused combined overflow on the waters of the nation has been estimated as equivalent to as much as 160 percent the strength of the domestic sewage biochemical oxygen demand. This amount creates a major source of pollution for the nation's water courses. The Cornell et al. report further describes certain tests, results and recommendations with respect to the use of high-rate fine-mesh screens for primary treatment of storm water overflow from combined sewer systems, the equipment described being similar to that disclosed in said application Ser. No. 640,241 and Pat. No. 3,511,373. The present inventive concepts involve certain improvements thereover.

In light of the foregoing, it is a principal object of the present invention to provide improved screening equipment and methods.

A further object of this invention is to provide an improved screening device employing a rotating screen and distribution means associated therewith.

Another object of this invention is to provide an improved screening arrangement for a rotating screening device.

A further object of this invention is to provide an improved screening device employing a rotating screen and means for receiving and recycling backsplash from said screen.

Other objects and features of the present invention will become apparent through a consideration of the following description and attached drawings.

SUMMARY OF THE INVENTION

There is disclosed herein a screening apparatus, such as for use in screening of storm water overflows from sewer systems, comprising a substantially cylindrical rotary screen device disposed for rotation within a housing, feed means for directing an influent toward the inner surface of the screen, and outlet means for receiving (a) the effluent which passes through the screen, (b) the concentrate which does not pass the screen, and (c) backsplash from the screen.

The feed means includes an upwardly extending feed pipe, or the like, for supplying the influent to the screen. The feed means may include adjustable means for varying the rate of flow of influent, and deflector means may be provided for directing the flow of influent as a plurality of substantially discrete inclined streams toward the inner surface of the screen.

The rotary screen is in the form of a substantially cylindrical cage and includes a plurality of screen panels, which may be removed for repair, cleaning or replacement with different mesh screens or different screen cloth. The speed of rotation of the screen is selected to provide a desired centrifugal force, or g-loading, of influent on the screen, the g-loading being a function of the radius of the screen and the square of the rpm thereof. The velocity of flow of influent onto the screen is selected within a preferable range below which suitable impingement does not occur, and above which excessive splashback and possible screen damage may occur. A typical flow velocity is in a range around approximately 13 to 15 feet per second, and exemplary preferred screen speeds are approximately 65 rpm for a 60 inch diameter screen and 88 rpm for a 36 inch diameter screen, it being appreciated that other suitable flow velocities, screen speeds, diameters, and the like may be employed without departing from the present concepts.

The influent preferably is screened to achieve a relatively fluid concentrate, as distinguished from a dry concentrate, so that the same may be readily transported or pumped for further treatment or disposal.

A screen cleaning apparatus is provided for spraying cleaning fluid through the screen at desired intervals. In the screening of an influent, it is preferable to cyclically (a) feed the influent for a predetermined period of time, (b) terminate the feed, (c) spray the screen with a cleaning fluid for a shorter predetermined period, and (d) return the feed of influent. An exemplary cycle includes feeding influent for four and one-half minutes and cleaning the screen for one-half minute, including a cleaning spray from outside to inside of the screen for a few seconds and then inside to outside of the screen for a few seconds.

Although a complete screening apparatus and methods involving a number of novel concepts and structures are disclosed herein, the application is particularly directed to an improved rotating screening device and handling of backsplash of influent from the screening device, as well as particular screen constructions for the screening device; whereas, said other applications filed concurrently herewith are directed to other novel features disclosed herein.

BRIEF DESCRIPTION OF THE DRAWINGS

FIG. 8 is a partial top view of the screen of FIG. 7; and

FIGS. 9A and 9B are views illustrating the manner in which screen panels are secured to the screen cage of FIG. 7.

DESCRIPTION OF PREFERRED EMBODIMENTS

Figure 1:
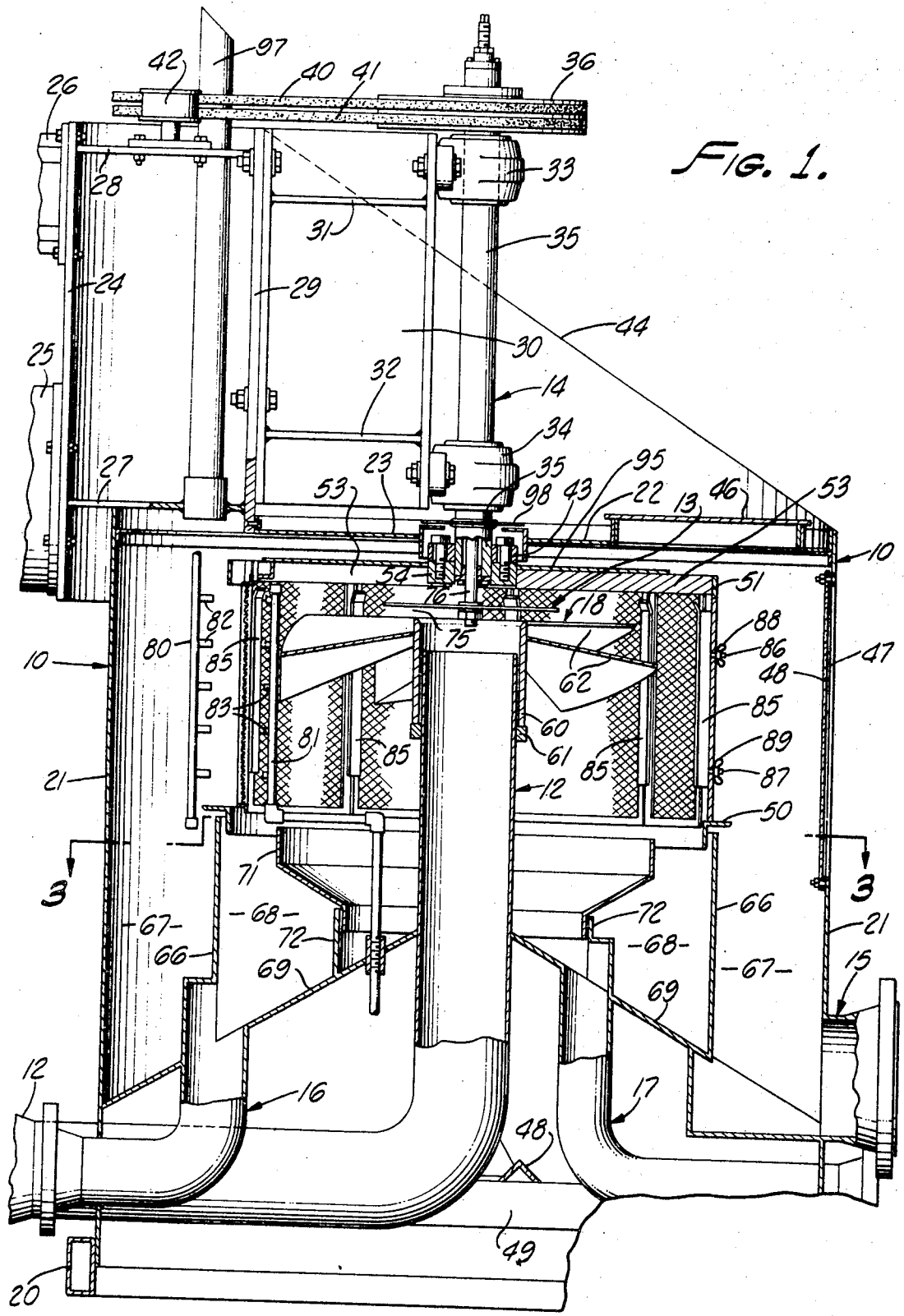
FIG. 1 is a cross-sectional elevational view of a preferred screening apparatus.
Figure 2:
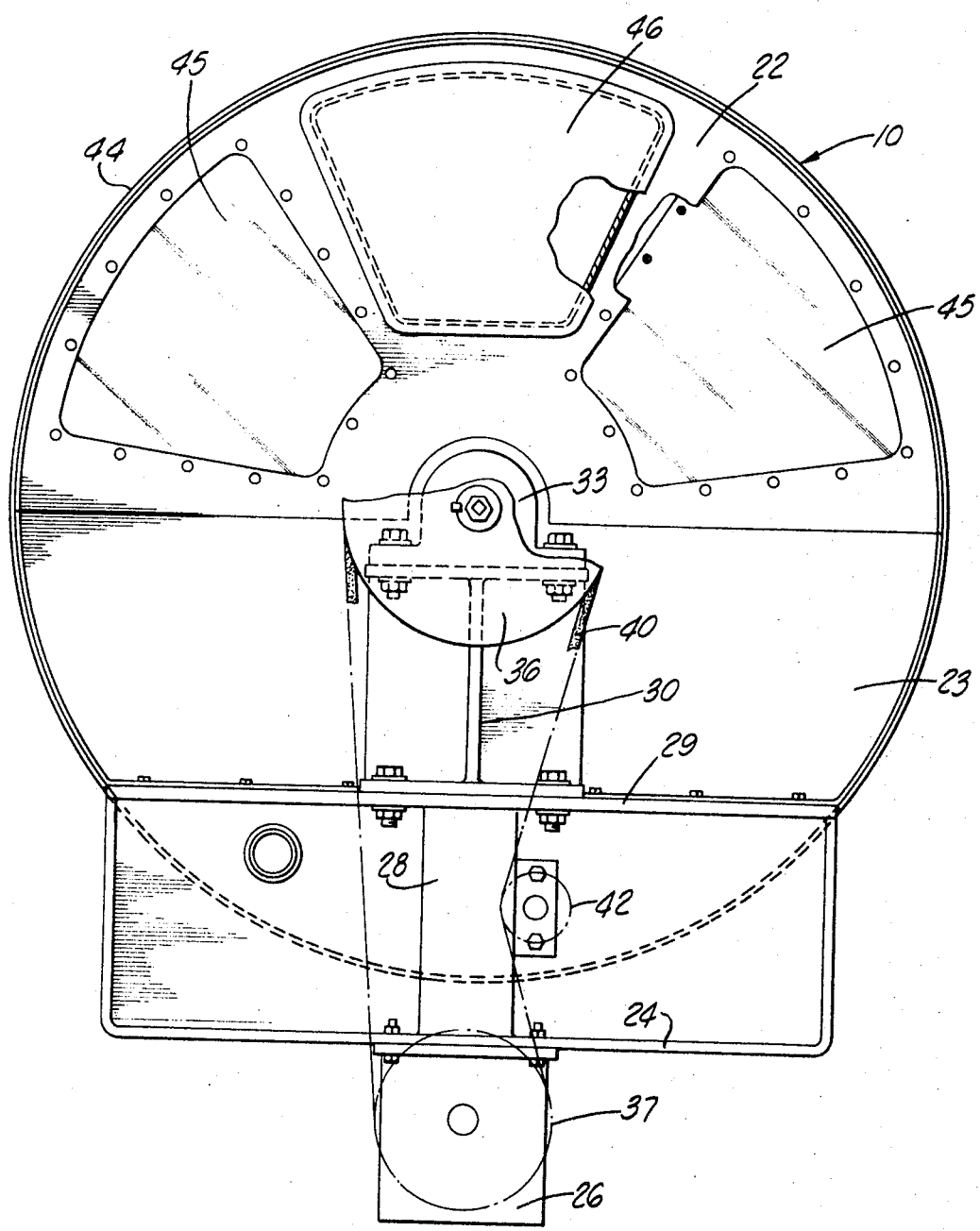
FIG. 2 is a top plan view of the apparatus of FIG. 1.
Figure 3:
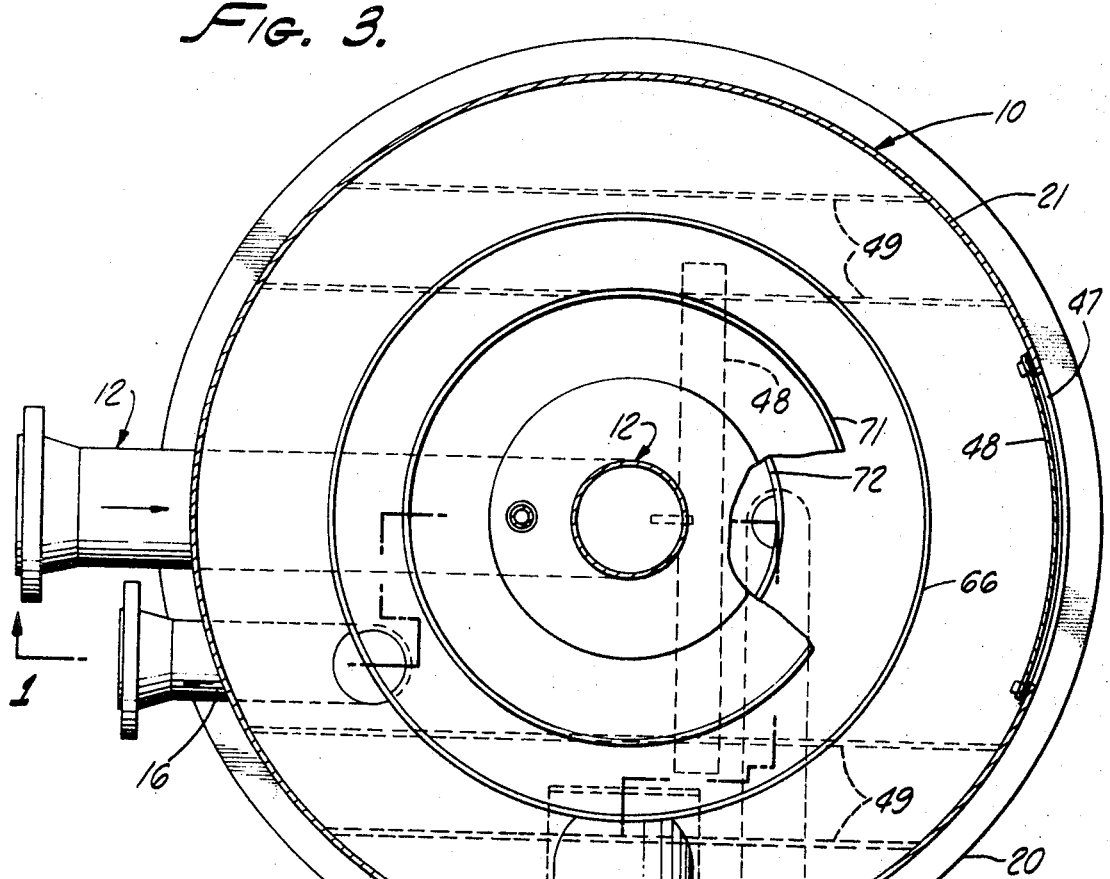
FIG. 3 is a cross-sectional view of the apparatus taken along a line 3—3 of FIG. 1.

Turning now to the drawings, and particularly to FIGS. 1 through 3, a rotary screening device is illustrated including an outer substantially cylindrical housing 10 containing a rotary screen cage 11, an influent inlet feed pipe 12, an influent impingement plate or diverter 13, a drive assembly 14 for the screen cage 11, an effluent outlet 15, a concentrate outlet 16, and a backsplash outlet 17. It should be noted at this point that FIG. 1 is an elevational cross section view taken along a line 1—1 of FIG. 3; whereas, FIG. 3 is a cross-sectional plan view taken generally along a line 3—3 of FIG. 1.

As will be more fully explained subsequently, an influent, such as storm water overflow having enormous amounts of water and relatively little solids, is fed to the feed pipe 12 and deflected outwardly by the impingement plate 13 toward the inside of the rotating screen cage 11. The screen cage includes a plurality of screen panels, and the influent is screened resulting in a highly liquid effluent and a concentrate which is substantially less liquid but flowable. The effluent is discharged by outlet 15 and the concentrate is discharged by outlet 16. The screen cage 11 is rotated at a speed to provide a suitable centrifugal force for the screening action, and the impingement plate 13 is positioned to provide the desired flow rate of influent toward the screen cage. A distribution dome 18 may be provided to direct the influent as a plurality of substantially discrete inclined flows toward the inner surface of the screen cage. Influent which splashes back from the inner surface of the screen cage may be redirected to the cage for more complete screening, as by collecting the backsplash and recycling the same with incoming influent. The upflow of influent provided by the feed pipe 12 simplifies the design and construction of the apparatus and generally involves less fluid head loss than encountered with a feed of influent to the screen cage from above the apparatus.

These screening concepts serve to reduce pollution caused, for example, by overflow of combined storm-sanitary sewage systems during periods of heavy rain fall. As much as one third of the sewage solids settle to the bottom of large combined sewers and in periods of heavy rain, they flow into streams, lakes, rivers and costal waters without treatment. Thus, during storm peaks, up to 95 percent of the untreated sanitary sewage may overflow into receiving waters. As a result, combined treatment systems often loose more pollutants to their rivers and streams than they take out in the treatment plant itself.

As will appear from the following description and drawings, the present apparatus and concepts meet many storm-sanitary pollution control requirements for a compact, low cost, high volume, primary treatment system. The present apparatus is capable of releaving a combined sewage system of its hydraulic overload during storm periods, while sending a pollutant concentrate to the treatment plant. Exemplary apparatus is approximately 7 feet in diameter and 6 feet high and employs approximately nine to 18 removable screen panels on a revolving screen cage. A combination of high velocity influent flow and centrifugal force can allow approximately 90 to 95 percent of a hydraulic flow of three million gallons per day to pass through the screens. The remaining concentrate containing a high percentage, such as 99 percent, of the floatable and settleable solids is discharged separately into the hydraulically relieved sewage system.

Considering the construction of the apparatus in more detail, the housing 10 includes a base 20, a substantially cylindrical upstanding wall 21, and covers 22 and 23 to provide a substantially closed container. The screen drive assembly is secured to the top of the apparatus and includes a mounting plate 24 for supporting a motor, only the base 25 thereof being seen in the drawings, and a gear box 26. Suitable support and spacing plates 27 through 29 are provided to which an I-beam 30 with gussets 31 and 32 are secured to form a bearing mount. A pair of bearings 33 and 34 are secured to the bearing mount. A shaft 35 is journaled in the bearings 33 and 34 and has a drive pulley 36 affixed at the upper end thereof. A pulley 37, as seen in FIG. 2, is coupled with the output shaft of the gear box 26, and the pulleys 36 and 37 are coupled by means of V-belts 40 and 41. An idler 42 may be provided to maintain proper belt tension. As will be apparent to those skilled in the art, the motor is coupled with the input shaft of the gear box 26 in any suitable manner, as by V-belts, and drives the shaft 35 through the bear box, pulleys 37 and 36, and the V-belts 40 and 41. A collar 43 is secured, as by welding, to the lower end of the shaft 35, and the screen cage 11 is attached to this collar to enable the shaft 35 to rotate the screen cage 11.

The wall 21 of the housing 10 extends upwardly as indicated at 44. The cover 22 may be a lift-off cover, and includes windows 45 as seen in FIG. 2 to enable observation of the interior of the apparatus. A removable access door cover 46 may be provided. The wall 21 of the housing 10 may include a window 47 for observation of the interior of the apparatus. Suitable bracing is provided within the housing for structural purposes and for firmly supporting the various pipes. An angle bracket 48 and braces 49, for example, are provided as illustrated in FIGS. 1 and 3.

Figure 7:
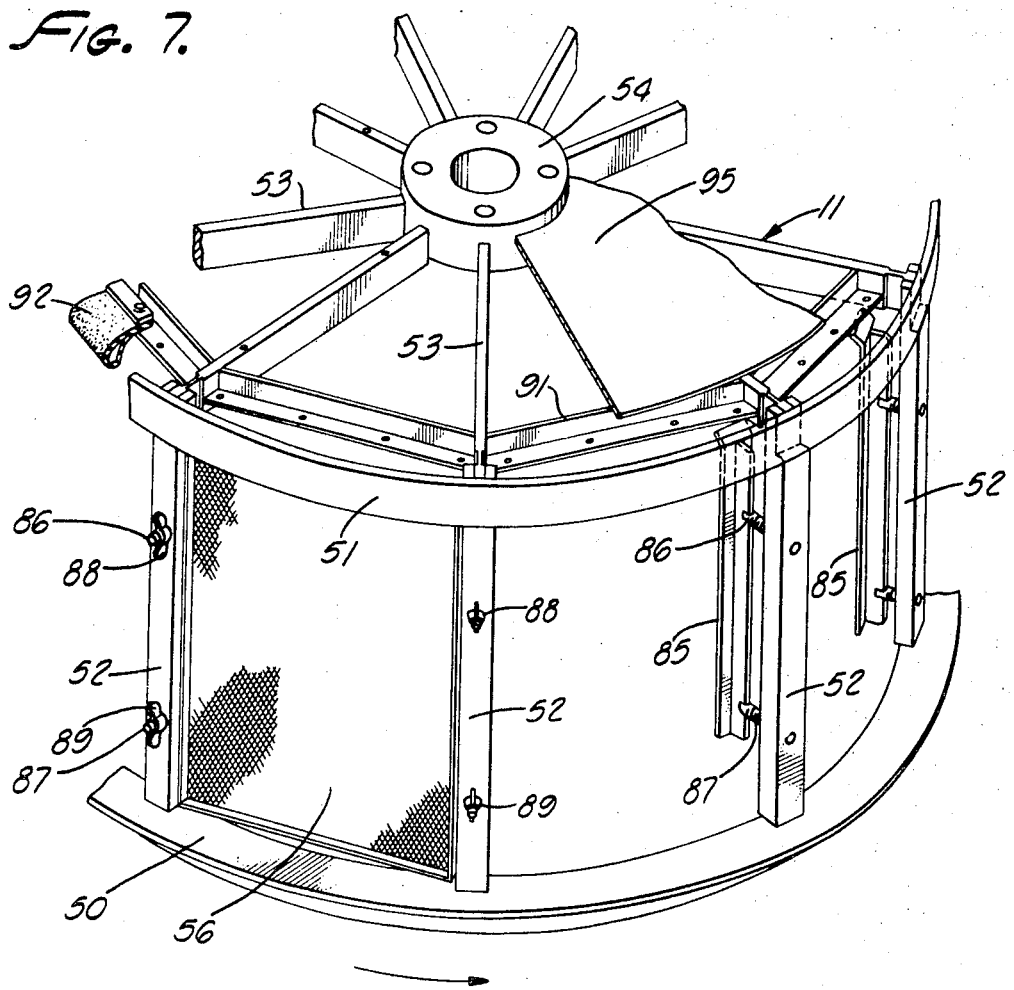
FIG. 7 is a partial perspective view of a rotary screen cage of the apparatus of FIG. 1.

The screen cage 11 will be described in more detail subsequently, but generally includes a cage formed of a lower angle ring 50, an upper bar ring 51, and a plurality of upstanding bars 52 extending between the angle ring 50 and bar ring 51 as best seen in FIGS. 7 and 8. Nine bars 52 have been used for an exemplary cage approximately 36 inches in diameter. Support ribs 53 are connected between the various bars 52 and a central collar 54 which is secured to the collar 43 affixed to the shaft 35. Removable screen panels 56 having a frame and screening material of metal or cloth secured thereto are inserted between the vertical bars 52 and clamped thereto in a substantially sealed relationship.

Figure 5:
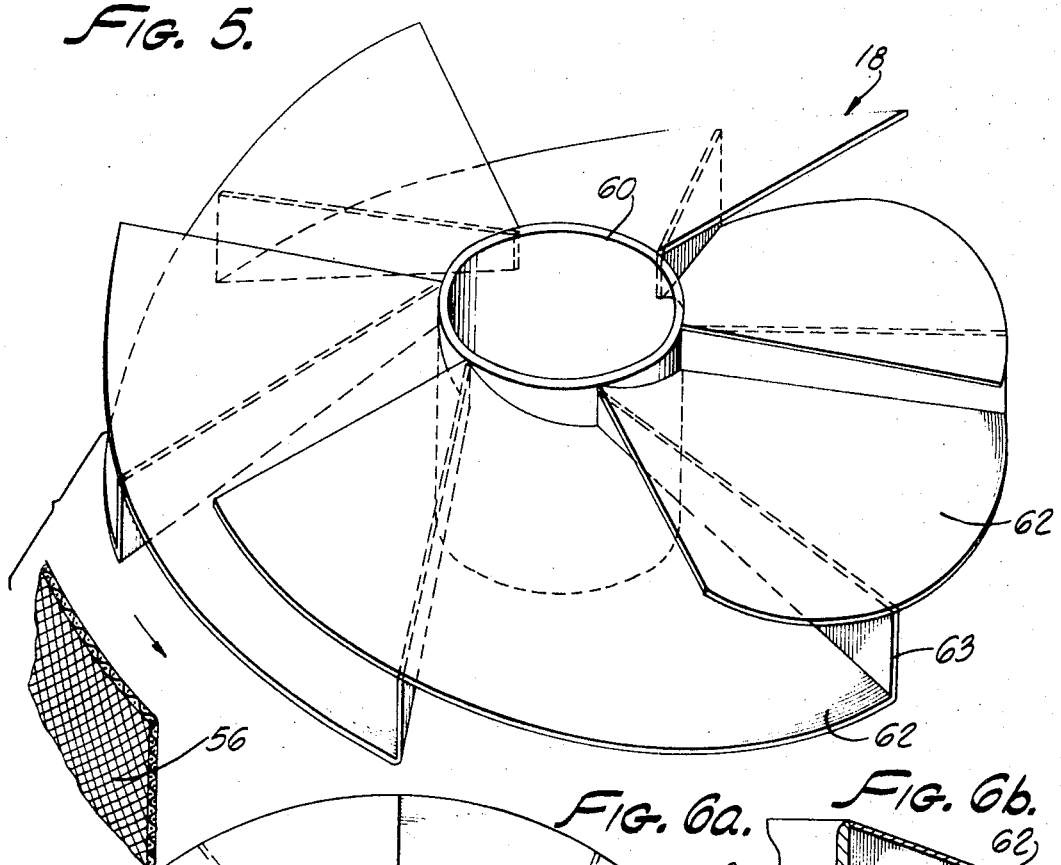
FIG. 5 is a perspective view of a distribution dome of the apparatus of FIG. 1.
Figure 6B:
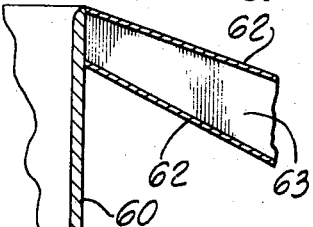
FIG. 6A is a top view and FIGS. 6B and 6C are fragmentary cross-sectional views of the distribution dome of FIG. 5.
Figure 6C:
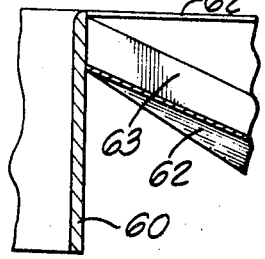
Figure 6A:
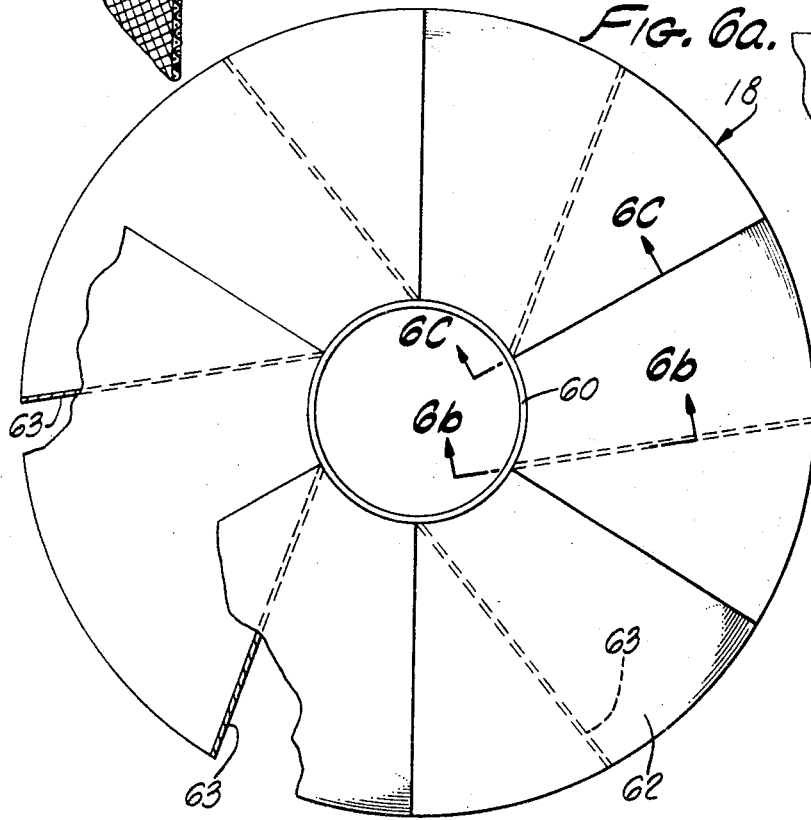

As noted earlier, an influent to be screened is supplied through the influent pipe 12 and directed upwardly toward the impingement plate 13. The plate deflects the flow outwardly toward the inner surface of the screen panels 56 of the screen cage 11. The vertical position of the plate 13 is adjustable as will be explained subsequently so as to control the rate of flow of influent. The distribution dome 18 as best seen in FIGS. 1 and 5 is secured to the upper end of the pipe 12. This dome 18 includes a sleeve 60 which rests on a collar 61 affixed to the pipe 12, and a plurality of inclined plates 62 secured to the outer surface of the sleeve 60. A portion 63 of each plate may be bent upwardly as shown in FIG. 5, or separate spacers may form the portions 63, and secured to the underside of the next succeeding plate so as to form a rigid structure. The distribution dome 18 functions to direct influent, which has been deflected by the impingement plate 13, into substantially inclined streams toward the inner surface of the screen panels. An interior wall or divider 66 which is substantially cylindrical is secured within the housing and extends almost up to the horizontal surface of the flange of the angle ring 50. This divider forms, in combination with the housing wall 21, an annular chamber 67 for receiving effluent and directing the same to the effluent outlet 15. The effluent, as is known to those skilled in the art, is the material which passes through the screen cage 11. The divider 66 also encloses a concentrate chamber or bowl 68 which has an inclined bottom 69 for directing concentrate to the concentrate outlet 16.

A back-splash pan 71 is positioned within the chamber 68 and coupled with a support 72. The pipe 17 communicates with the interior of the pan 71. The top of the pan 71 is approximately at the elevation of the bottom of the screen panels and the radius of the upper portion of the pan 71 is slightly smaller than the interior diameter of the screen cage 11 so as to receive influent which splashes back from the inner surface of the screen cage 11 and screen panels 56. The radius of the pan 71 typically may be about 2 inches less than the radius of the screen cage 11. Concentrate flows through the gap between the interior of the cage and the exterior of the pan 71 to the chamber 68.

The purpose of the backsplash pan 71 is to enable any influent which splashes from the screen cage 11 to be collected for either recycling with incoming influent or sent to another separator device for screening to ensure that the maximum desired split between effluent and concentrate is achieved. Alternatively, other methods of collecting backsplash may be provided, as for example a baffle below the distribution dome 18 which catches or otherwise deflects the backsplash material back toward the inner surface of the screen panels at the lower portion of the screen cage 11. In a test with a 2200 gallon per minute influent flow with no screen panels in the screen cage, it was found that 46 gallons of concentrate was collected in the concentrate chamber 68. It is believed that this occurred because of backsplash from the screen cage bars 52. By recycling or further screening of this 46 gallons of backsplash in a normal operation with screens it has been computed that the split would be improved by 2 percent or better.

Figure 4A:
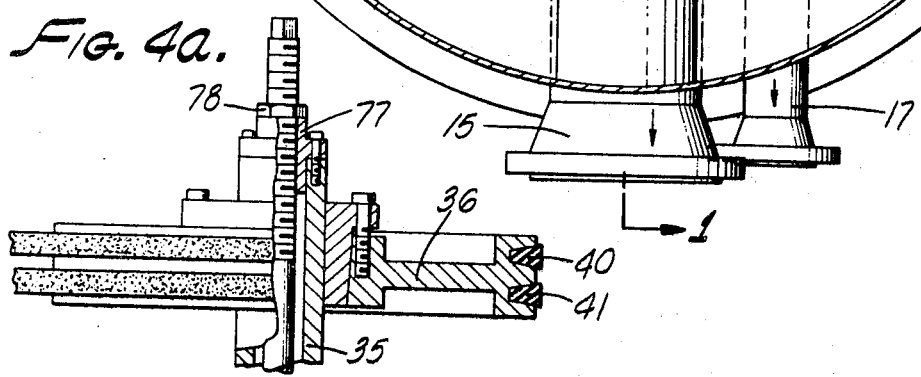
FIGS. 4A and 4B are cross-sectional views illustrating an adjustable influent plate of the apparatus of FIG. 1.
Figure 4B:
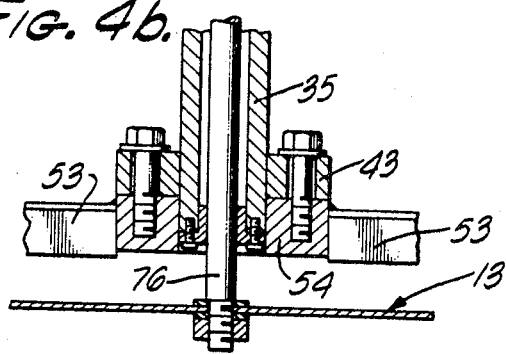

Turning again to the influent impingement plate 13, the same is adjustable up and down as noted earlier. The purpose of this adjustment is to enable control of an orifice area 75 between the lower surface of the plate 13 and upper end of the sleeve 60 of the distribution dome 18, or upper end of the pipe 12 in the event the same extends above the sleeve 60. This allows control of the rate of flow of influent. The plate 13 is secured to a rod 76 which extends upwardly through the shaft 35 as seen in FIGS. 1 and 5a and 4b. The upper end of the rod 76 is threaded into a threaded bushing 77 which is secured to the upper end of the shaft 35. The rod 76 thus may be adjusted up or down to vary the position of the plate 13 with respect to the upper end of the sleeve 60, and may be locked in position by a locknut 78. With the construction thus described, the plate 13 rotates with the screen cage 11, but may be made stationary if desired by other suitable supporting structure.

The shape of the plate 13 may be other than flat, such as a segment of a sphere. However, it is desired that the flows of influent toward the inner surface of the screen cage 11 be substantially perpendicular to the inner surface of the screen panel 56 rather than significantly inclined upwardly or downwardly as viewed in FIG. 1. If these flows are sharply inclined downwardly, the concentrate is excessively liquid; but, on the other hand, if the flows are precisely horizontal and thus perpendicular to the inner surface of the screen panels the flows do not "fan out" sufficiently to give a wide sweeping flow onto the inner surface of the screen panels. Accordingly, it is desired that the flow of influent be almost perpendicular to the inner surface of the screen panels but at a slight downward angle to obtain a divergent flow, or fan-out of the flow, by the time the influent hits the screen panels. Each flow of influent should fan out to anywhere from substantially the entire height of the screen panels to approximately one-half the height of the screen panels, or slightly less such as to provide an impingement area of influent onto the screen panels about 6 inches high. Thus, it is desired that the flows fan-out slightly, but still flow substantially horizontally from the orifice 75, the fanning-out being accomplished by the distribution dome 18 into essentially discrete inclined streams. If only a portion of the height of the screen panels is swept by the influent flows, the panels can be turned over end-for-end after a period of use to maximize screen life.

As noted earlier, the majority of the existing combined sewers throughout the nation do not have adequate capacity during heavy storm periods to transport all waste and storm-caused combined flows to a treatment facility. The overflow is bypassed to a receiving stream, thus causing pollution problems. One of the principal applications of the present apparatus is in screening enormous amounts of water with solids, such as storm overflow, to separate out the solids and provide a relatively fluid, as distinguished from dry, concentrate which can then be properly handled by a sewage treatment facility. The effluent can be suitably disposed of, as for example in a stream. In this manner, the enormous amounts of water do not overtax the sewage treatment facility, while still enabling proper treatment of the maximum amount of solids from the overflow.

One of the principal objectives is to achieve a high split, that is, ratio of effluent (screened product) to concentrate (unscreened product), while still obtaining a slightly fluid concentrate which can flow continuously from the apparatus and be supplied, as by pumping, to subsequent primary treatment equipment without the problems involved in handling a solids concentrate. A typical ratio is better than 95 to 5 with the apparatus described herein and with a typical influent flow of about 1,000 gallons per minute. A number of factors affect this split, one of the principal factors being the centrifugal force involved in the screening operation, which varies as the square of the screen cage rpm and as a direct function of the radius thereof. There is a band of optimum performance in terms of centrifugal force. It has been found that a centrifugal force of around 3 g's appear to be optimum in achieving the maximum split, although it is to be understood that the force can be below or above this value somewhat. This approximate force or band around 3 g's can be obtained with a screen cage speed of approximately 65 rpm for a screen cage about 60 inches in diameter, and approximately 88 rpm for a screen cage about 36 inches in diameter. Substantially higher speeds do not improve the split. Additionally, other factors are important in achieving the maximum split, and these include the velocity of the feed of influent, such as approximately 13 to 15 feet per second, which can be selected by varying the size of the orifice 75 through adjustment of the plate 13; directing of the flows of influent substantially perpendicular to the inner surface of the screen cage as noted earlier; recycling or other screening of backsplash from the screen cage; maintaining the screen panels clean; and the orientation of the screen cloth in the screen panels.

The centrifugal force is important in achieving the maximum force on the solid and water particles for separation of the water from the solids, but must not be excessive because the solids will then tend to cling to the screen and bing or clog the screen and, additionally, screen damage may result from high forces. At the optimum force or band of force, the concentrate flows by gravity down from the screen. The provision of almost perpendicular influent flow to the inner surface of the screen is important as noted earlier so as to achieve the maximum separation with the minimum of backsplash or other deflection of influent from the screen cage. As to flow velocity, if the same is too low, insufficient influent reaches the screen. If too high, excessive backsplash occurs, and the high forces may cause premature damage to the screens. The backsplash represents unscreened influent, much of which is believed to be deflected from the bars 52 of the screen cage, and it is desired to recycle or otherwise further screen the backsplash to optimize the split. It will be apparent that the screen panels must be clean to achieve the best screening action, and a cycle of influent feed and spray cleaning with a cleaning fluid is preferred as will be described subsequently.

The orientation of the screen cloth within the cage is important from a wear-life standpoint. It is preferable that the screen cloth be bias mounted to form the screen panels 56 of FIG. 7 rather than positioning the cloth such that the wires or thread of the screen cloth run vertically and horizontally. The bias mounting disposes the wires or thread at substantially 45° angles resulting in better screen life because the screen wires are stressed and flexed equally and uniformly by the flows of influent. This longer life allows the screen cage to run longer with less down-time therefor improving the efficiency of screening. Also, the slope of the inclined plates 62 of the distribution dome 18 affects the height of which the flows impinge on the screen panels and, thus affects screen life. A 6 inch drop at the edge of the plate where the radial length of the plate is 28 inches gives a slope of 21 percent which has been found suitable for a 60 inch diameter cage.

Furthermore, it is believed that the direction of rotation of the screen cage with respect to the inclination of the plate 62 of the dome 18 may contribute to obtaining the most efficient screening operation. The direction of rotation of the screen cage 11 is preferably as indicated with respect to the screen panel 56 illustrated in FIG. 5 (counter clockwise) and as illustrated with respect to the screen cage in FIG. 8. Referring again to FIG. 5, the flows of influent leave the inclined plates 62 of the distribution dome 60 at substantially the angle of the plates 62 and continuously aid in sweeping large solid particles from the rotating screen.

Screen cleaning is achieved by means of supply pipes 80 and 81 having respective groups of nozzles 82 and 83. The nozzles 82 and 83 provide sprays of cleaning fluid through the screen panels. It is preferred to feed influent for a period of time, such as 4½ minutes to 5 minutes, stop the flow of influent and spray the screen panels with a cleaning fluid such as hot water containing a hypochlorite solution for one-fourth to 1 minute, and then continue to feed the influent. This operation continues cyclically, with the cleaning period lasting, for example, one-half minute, with a spray from the nozzles 82 for 10 seconds and then from the nozzles 83 for 20 seconds. It is desired to clean the screens before they get dirty which can be measured in terms of degradation of the split, for example, down to 90-to-10.

Turning again to the screen cage, and particularly FIGS. 7 through 9, preferably the screen panels 56 are removable for repair or replacement, and can be readily locked in place in the screen cage. Channels for receiving the edges of the screen panels 56 are provided by T-brackets 85 which are secured to the bars 52 by threaded stubs 86 and 87 and respective wing nuts 88 and 89. Braces 91 are secured between adjacent ribs 53, and a gasket 92 is affixed onto each brace 91 to form a seal with the top of each respective screen panel 56. The edges of the frame 93 of the screen panel 56 which abut with the bars 52 may have a bead of resilient material 94 thereon to form a seal between the screen panels and bars 52. The panel includes an angle frame and the screen fabric may be secured thereto with an epoxy adhesive. Exemplary screen fabric is 165 TBC providing 47 percent open area. Metal or synthetic fabrics can be used. Stainless steel fabric has been found suitable. A removable cover 95 having a removable section 96 may be provided for the top of the screen cage.

A vent pipe 97 may be provided to vent the interior of the housing 10 to the atmosphere. A plate 98 is attached to the shaft 35 above the cover portions 22 and 23 of the housing. Operation of the screening apparatus causes a higher pressure area toward the periphery of the screen cage 11, and air is drawn in between the plate 98 and cover portions 22-23 and vented by the vent pipe 97. This blow of air past the plate 98 aids in maintaining the bearings 33 and 34 clean and moisture - free. The plate 98 prevents material from splashing onto the bearings from the cover portions 22-23 where the shaft 35 extends therethrough.

The following represent exemplary test data from the screening of influent by apparatus like that described 36 inch screen cage, the actual inside diameter defined by the inner surface of the screen panels being approximately 30 inches. Table IA sets forth data obtained with a large orifice 75 opening; whereas, the data in Table IB involves variations in the orifice 75.

TABLE IA

| Test No. | Feed Approx. G.P.M. | RPM | Average % Concentrate | General Comments |
|---|---|---|---|---|
| 1 | 1,000 | 105 | 8.3% | 26 gpm splashback |
| 2 | 1,000 | 0 | 2.3% | No screens-not rotating |
| 3 | 1,005 | 120 | 0.8% | No screens-rotating |
| 4 | 1,000 | 60 | 1.3% | No screens |
| 5 | 1,000 | 72 | 1.2% | No screens |
| 6 | 1,000 | 93 | 1.0% | No screens |
| 7 | 1,000 | 78 | 1.0% | No screens– |
| 8 | 1,000 | 0 | 2.2% | No screens not rotating |
| 9 | 1,000 | 78 | 1.0% | No screens |
| 10 | 1,000 | 0 | 12.0% | 7-165 TBC panels, 2-165/4 panels |
| 11 | 1,000 | 78 | 8.6% | 7-165 TBC panels, 2-165/4 panels |
| 12 | 1,500 | 78 | 13.4% | 7-165 TBC panels, 2-165/4 panels |
| 13 | 650 | 78 | 9.2% | 7-165 TBC panels, 2-165/4 panels |
| 14 | 1,000 | 0 | 15.0% | 7-Yb 165 TBC panels, 2-105 Dacron panels |
| 15 | 1,00 | 87 | 8.6% | 7-165 TBC panels, 2-hb 105 Dacron panels |

TABLE IB

| Test | Approx. G.P.M. | RPM | Feed Orifice | Average % Concentrate | General Comments |
|---|---|---|---|---|---|
| 16 | 1,000 | 90 | ¼" | 4.3% | Screens as above- 40 ft/sec feed velocity |
| 17 | 1,000 | 90 | ¾" | 2.0% | 15 ft/sec feed velocity- ≈ 3 g.'s e.f. |
| 18 | 1,000 | 90 | 1" | | |
| 19 | 1,000 | 90 | ¾"+1 turn | 2.2% | |
| 20 | 1,000 | 90 | "–1 T | 2.0% | |
| 21 | 1,000 | 90 | ¾"–½T | 2.0% | |
| 22 | 1,000 | 90 | ¾–¼T | 2.0% | |
| 23 | 1,000 | 90 | ¾"+¼T | 1.93% | |
| 24 | 1,000 | 90 | ¾" + 1¾T | 1.76% | |
| 25 | 1,000 | 90 | ¾"+1¼T | 1.67% | |
| 26 | 1,000 | 90 | ¾"+1¾T | 1.88% | |
| 27 | 1,000 | 90 | ¾+1 T | 1.76% | |
| 28 | 1,000 | 90 | ¾+1⅓ T | 2.00% | |
| 29 | 1,000 | 90 | ¾+5/6 T | 1.71% | |
| 30 | 1,000 | 120 | ¾+5/6 T | 1.67% | |
| 31 | 1,000 | 60 | ¾ + ⅝ T | 2.3% | |
| 32 | 1,000 | 90 | 13/16" | 1.7% | |
| | 250 PPM — Paper Pulp Solution | | | | |
| 33 | 1,000 | 90 | 13/16" | 5.0% | |
| 34 | 1,000 | 90 | 13/16" | 7.7% | (Dirty Screens) |

Tests 1 through 32 are on a clean water influent, and tests 33 and 34 involve an approximately 250 part per million paper pulp solution. As is apparent from Tables IA and IB, a split of 8.3 to 8.6 percent was obtained in tests 1 through 15 on clean water; however, the feed impingement velocity was well under 10 feet per second. Commencing with test No. 16, changes were made in the impingement plate 13 adjustment and thus represent performance in terms of concentrate split at different orifice openings and rpm's. The references under the feed orifice column to +1 turn, − 1 T, and so forth refer to turns of the rod 76 which was threaded nine turns per inch. Test No. 25 represents the best performance in terms of concentrate split. Test No. 30 indicates that no substantial improvement in split was gained by increasing the rpm above 90 rpm. Ninety rpm for this apparatus provides about 3 g's of centrifugal force which also has been found to be substantially optimum for a 60 inch separator unit operating at 65 rpm. Likewise no substantial improvement was found in test No. 31 at 60 rpm.

It should be noted that 124 rpm gives over 6 g's and sixty rpm gives less than 2 g's for the approximately 30 inch diameter screen involved. Although a useful split is obtained, more optimum operation occurs, consistent with maximum screen life and obtaining a slightly wet concentrate, when the centrifugal force is nearer to 3 g's. However, it is intended herein by reference to approximately 3 g's centrifugal force to refer to a band of centrifugal force around 3 g's such as 1 to 7 g's, but preferably closer to 3 g's.

The following Table II includes data wherein the influent was raw sewage, and summarizes 14 test runs of the same unit. Initial tests utilizing a 165 fusion bonded four mesh screen indicated a concentrate split ranging from 6 to 8 percent. Later runs with bias mounted 165 TBC screens indicated a substantial improvement in split as compared with the fusion bonded 165/4. Test No. 6 is not believed to be representative because the influent was of unusual character. The 165 TBC screen panels provided the best performance at approximately 90 rpm as can be seen from Table II. It should be noted that the concentrate volume in both test Nos. 8 and 9 at the lower 62 rpm increased substantially as compared with the 90 rpm cage speed. Also, test Nos. 10 and 11 at 124 rpm indicate a wetter concentrate than at 90 rpm. The screen was cleaned in a cyclic manner as previously described. It will be noted that an increase in concentrate split was obtained by using the bias mount 165 TBC screen panels as compared to fusion bonded panels. Similar results in split have been obtained with similar apparatus having an approximately 60 inch diameter screen cage.

TABLE II

| Test No. | Feed Approx. g p m | rpm | Controlled Feed Opening | Average % Concentrate (too short screen) | Type of Screen |
|---|---|---|---|---|---|
| 1 | 1,000 | 83.5 | ⅝" | 6.0% | 165/4 fusion bonded |
| 2 | 1,000 | 83.5 | ¾" | 8.0% | 165/4 bonded |
| 3 | 1,000 | 103 | ¾" | 6.5% | 165/4 bonded |
| 4 | 1,000 | 103 | ⅝" | 6.5% | 165/4 bonded |
| 5 | 1,000 | 59 | ⅝" | 7.5% | 165/4 bonded |
| 6 | 1,000 | 86 | ⅝" | 2.9% | 165 TBC (abnormal feed) |
| 7 | 1,000 | 86 | ⅝" | 3.0% | 165 TBC (more normal feed) |
| 8 | 1,000 | 6 | ⅝" | 3.8% | 165 TBC |
| 9 | 1,000 | 62 | ⅝" | 3.5% | 165 TBC |
| 10 | 1,000 | 124 | ⅝" | 3.1% | 165 TBC |
| 11 | 1,000 | 124 | ⅝" | 2.9% | 165 TBC |
| 12 | 1,000 | 90 | ⅝" | 2.85% | 165 TBC |
| 13 | 1,000 | 90 | ⅝" | 3.25% | 5-165 TBC panels 4-165/4 bonded panels |
| 14 | 1,000 | 90 | ⅝" | 5.0% | All panels 165/4 bonded |

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. Screening apparatus comprising
support means,
a rotary substantially cylindrical screen structure supported by said support means for screening an influent to derive an effluent and a concentrate, said screen structure including a cage and a plurality of substantially flat screen panels coupled therewith with each of said screen panels including screening material having threads mounted on a bias with respect to the axis of said cage for allowing said threads to be stressed and flexed equally and uniformly by flows of the influent,
drive means coupled with said screen structure for rotating said screen structure, and
feed means for feeding said influent toward the inner surface of said screen structure.

2. Apparatus as in claim 1 wherein
said threads of said screening material are disposed at approximately 45° with respect to the axis of said cage.

3. A method of screening an influent containing substantial amounts of liquid and relatively few solids, such as storm water overflow, employing a rotating substantially cylindrical screen structure comprising
flowing said influent to within said screen structure,
deflecting said influent outwardly toward the inner surface of said screen structure to derive an effluent and a concentrate, said screen structure having means causing an amount of said influent to be deflected inwardly from said inner surface,
separately collecting said concentrate and said influent deflected inwardly from said inner surface, and
returning the inwardly deflected influent toward said screen structure and screening same with said screen structure.

4. Screening apparatus comprising
support means,
a rotary substantially cylindrical screen structure supported by said support means for screening an influent to derive an effluent and a concentrate, said screen structure having an inner surface,
drive means coupled with said screen structure for rotating said screen structure,
feed means for feeding said influent toward the inner surface of said screen structure,
collector means disposed below said screen structure for receiving said concentrate, and
separate collector means mounted for receiving influent which is inwardly deflected from said inner surface of said screen structure, and means coupled with said separate collector means for returning such inwardly deflected and collected influent to the incoming influent to allow screening thereof by said screen structure.

5. Apparatus as in claim 4 wherein
said separate collector means includes pan means mounted below said screen structure and extending substantially to the inner surface of said screen structure.

6. Apparatus as in claim 4 wherein
said screen structure comprises a cage and a plurality of substantially flat screen panels coupled therewith, each of said screen panels including screening material having threads mounted on a bias with respect to the axis of said cage.

7. Apparatus as in claim 6 wherein
said threads are disposed at approximately 45° with respect to the axis of said cage.

8. Apparatus as in claim 4 including
deflector means mounted within said screen structure for deflecting the flow of influent as a series of substantially discrete inclined flows toward the inner surface of said screen structure, said deflector means including a plurality of inclined plates, and
said screen structure being rotated by said drive means in the direction of downward incline of said plates.

* * * * *